United States Patent
Mishra et al.

(10) Patent No.: US 11,636,360 B1
(45) Date of Patent: Apr. 25, 2023

(54) COMMUNICATION ROUTING BETWEEN AGENTS AND CONTACTS

(71) Applicant: Amazon Technologies, inc., Seattle, WA (US)

(72) Inventors: Sonu Kumar Mishra, Seattle, WA (US); Vamsi Polapragada, Redmond, WA (US); Juliana Saussy, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 353 days.

(21) Appl. No.: 16/903,259

(22) Filed: Jun. 16, 2020

(51) Int. Cl.
*G06N 5/04* (2006.01)
*G06F 16/23* (2019.01)
*G06N 20/00* (2019.01)
*H04M 3/51* (2006.01)

(52) U.S. Cl.
CPC ........... *G06N 5/04* (2013.01); *G06F 16/2379* (2019.01); *G06N 20/00* (2019.01); *H04M 3/5166* (2013.01)

(58) Field of Classification Search
CPC ...... G06N 5/04; G06N 20/00; G06F 16/2379; H04M 3/5166
USPC ....... 706/12, 16, 25, 14; 379/265.05, 265.12
See application file for complete search history.

(56) References Cited

U.S. PATENT DOCUMENTS

| 9,930,180 | B1 * | 3/2018 | Kan | H04M 3/5232 |
| 10,542,148 | B1 * | 1/2020 | Merritt | G06N 20/20 |
| 2005/0043986 | A1 * | 2/2005 | McConnell | H04M 3/5232 379/265.02 |

* cited by examiner

Primary Examiner — Thjuan K Addy
(74) Attorney, Agent, or Firm — Lee & Hayes, P.C.

(57) ABSTRACT

Technology is described for routing communications between contacts and agents. Associations may be generated between agents and contacts who intend to communicate with the agents. Weightings for the associations between the agents and the contacts may be determined using a machine learning model to produce weighted associations. The weightings may represent a predicted interaction metric between the agents and the contacts. Selected pairs of agents and contacts may be determined by applying matching rules to the weightings. Communications may be routed between the contacts and the agents in accordance with the selected pairs of agents and contacts.

20 Claims, 11 Drawing Sheets

COMMUNICATION ROUTING BETWEEN AGENTS AND CONTACTS

BACKGROUND

A call center or virtual call center allows agents that work at the call center to communicate with customers or contacts. For example, when the call center is an inbound call center, contacts may communicate with agents at the call center for product or service support or for information enquiries. In another example, when the call center is an outbound call center, agents at the call center may communicate with contacts for purposes of telemarketing, solicitation of charitable or political donations, debt collection, market research, emergency notifications, etc. The communications between the agents and the contacts may be via telephone, electronic mail, electronic instant messaging, etc.

In one example, a contact that initiates a communication with an inbound call center may be placed on a queue with other waiting customers. When an agent at the call center becomes available, the customer that is waiting in the queue may be matched with an available agent. For example, the customers may be matched with available agents in a first-come, first-serve basis, such that a customer that has been waiting a longest period of time as compared to other customers in the queue may be first in line to be matched with the next available agent.

DETAILED DESCRIPTION

Figure 1:
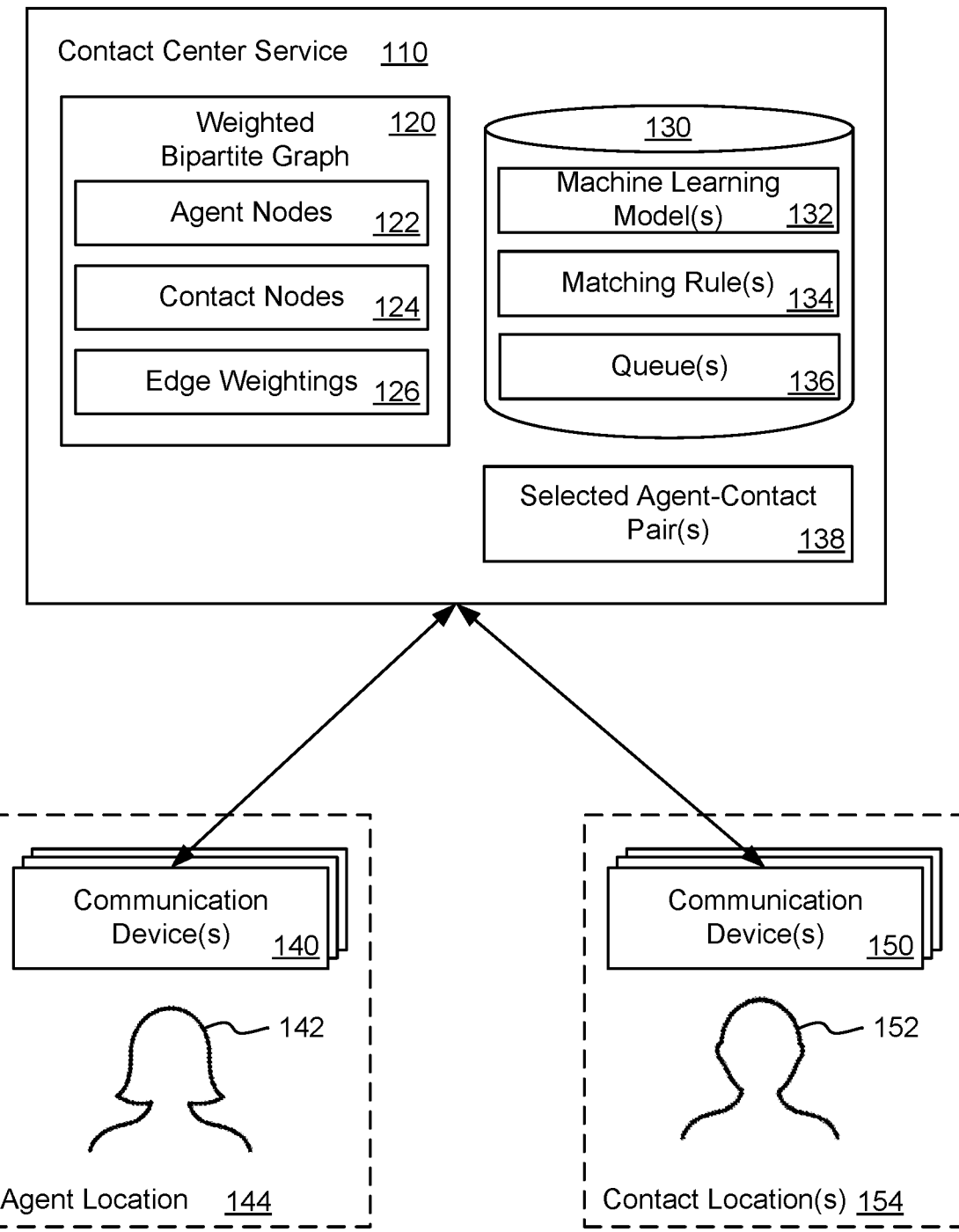
FIG. 1 illustrates a system and related operations for determining selected pairs of agents and contacts using edge weightings from a weighted bipartite graph and routing communications in accordance with the selected pairs of agents and contacts according to an example of the present technology.

Technologies are described for routing communications between contacts and agents using a contact center service that operates in a service provider environment. The contacts may be customers, purchasers, users, etc., and the agents may be personnel that are skilled in providing a type of service (e.g., customer service such as technical support or retail service, medical service, counseling, etc.) to the contacts. Contacts may request to communicate with agents that are available via a computing device (e.g., a mobile phone, a web application that runs in a browser of a computing device). A communication between a contact and an agent may be a voice-based communication or a text-based communication. The contacts may be matched to agents using a machine learning model based in part on attributes of the contacts and attributes of the agents. As a result, the contacts may be matched with agents who would result in improved interaction metrics between the contacts and the agents. The improved interaction metrics may be improved call center metrics which may include, but are not limited to, an improved average handle time (AHT), an improved first call resolution score, an improved customer satisfaction score, an improved sales conversion score or another selected interaction metric.

In one example, the contact center service may provide services to multiple different customers of the contact center service. For example, each of those customers may select a different interaction metric to improve or emphasize, and the machine learning model and/or matching rules may be selected to achieve those different interaction metrics. In another example, a customer may define time periods where different interaction metrics should be improved upon. For example, if there is typically a long wait time between 10 AM and 3 PM, the customer may select to emphasize handle times during that time period while selecting to improve customer satisfaction scores outside of that time period.

In one example, the contact center service may receive requests from contacts to communicate with available agents. For example, the contacts may wish to speak to an available agent for customer support or for another reason. The contact center service may place the contacts in a queue of contacts who intend to communicate with agents that are available. Further, the contact center service may identify agents that are currently available to communicate with the contacts. The contact center service may generate a graph, such as a bipartite graph, that includes agent nodes corresponding to human agents that are available and contact nodes corresponding to human contacts who intend to communicate with the agents. The bipartite graph may include edges between the agent nodes and the contact nodes. In one specific example, each agent node may have an edge with each contact node in the bipartite graph. Alternatively, agent nodes may have an edge with many contact nodes in the bipartite graph (e.g., some graph edges may not be available due to business rule restrictions and may be filtered out).

The contact center service may determine edge weightings for the edges in the bipartite graph to produce a weighted bipartite graph. The edge weightings may represent a predicted interaction metric between the agents associated with the agent nodes and the contacts associated with the contact nodes. In other words, the contact center service may predict a value of an interaction metric for the human agent-contact pairs in the weighted bipartite graph. The predicted interaction metric may include a predicted average handle time, a predicted first call resolution score, a predicted customer satisfaction score, a predicted sales conversion score, etc. The prediction interaction metric may be an arbitrary customer-defined interaction metric. The predicted interaction metric may be a predicted score or value that describes or represents a quality of a communication between a human agent and a human contact. The predicted interaction metric may be a predicted measure, grade or mark to be representative of the communication between the human agent and the human contact. The predicted interaction metric may be a value or score representing a predicted outcome being achieved during the communication between the human agent and the human contact (e.g., a sale or service subscription). In one example, the contact center service may use a machine learning model to determine the edge weightings for the edges. The agent attributes of the agents and the contact attributes of the contacts may be provided as inputs or features to the machine learning model, where the machine learning model may produce the edge weightings as an output. The machine learning model may have been previously built and trained to determine predicted interaction metrics based on training data consisting of agent attributes, contact attributes and previous agent-contact interaction pairs and the results of those pairings. The agent attributes and the contact attributes may include, but are not limited to: time zone regions, language skills, technical skills, demographic information, etc.

The contact center service may determine selected pairs of agents and contacts using the edge weightings from the weighted bipartite graph. Agent-contact pairs may be unique pairs of agents and contacts. In a more specific example, the selected pairs of agents and contacts may be determined by applying matching rules to the weighted bipartite graph. The matching rules may be associated with a matching process including, but not limited to, an assignment solver process, a minimum cost flow process or a maximum cost flow process. Alternatively, the edge weightings from the weighted graph may be provided to a second machine learning model to determine the selected pairs of agents and contacts. The second machine learning model may use deep learning, neural networks or similar mechanisms for selecting the pairs of agents and contacts. Further, communications between the contacts and the agents may be routed in accordance with the selected pairs of agents and contacts. For example, based on a specific agent-contact pair, the contact center service may establish or route a communication between an agent and a contact corresponding to the agent-contact pair. For example, the agent-contact pair may be connected via voice, text chat, or another means. In another example, the contact center service may transmit a communication assignment(s) to an external or separate communication system to enable communications to be established between the contacts and the agents in accordance with the selected pairs of agents and contacts. In other words, the communication assignment may indicate a particular agent-contact pair that are to communicate or are to be connected. A communication assignment(s) may include one or more agent and contact pairings that are to communicate through the communication service.

FIG. 1 illustrates an example of a system and related operations for determining selected agent-contact pairs 138 using edge weightings 126 from a weighted bipartite graph 120 and routing communications (e.g., voice, text, messaging, etc.) in accordance with the selected agent-contact pairs 138. The selected agent-contact pairs 138 may be determined and stored in a data store 130, and the communications may be routed using a contact center service 110.

In one example, a communication device 150 (e.g., a mobile phone, tablet computer, desktop computer) associated with a contact 152 may send a request to the contact center service 110 to be connected to an agent 142 that is available. The contact 152 may be one of a plurality of contacts 152 and the agent 142 may be one of a plurality of agents 142. The contact 152 may be a customer, purchaser, individual, user, etc. and the agent 142 may be a person that is skilled in providing a type of service (e.g., customer service, medical service, technical service, etc.) to the contact 152. The contact 152 may wish to speak to the agent 142 in order to receive the type of service. The contact 152 may be located at a contact location 154, such as a home or work office. Similarly, the agent 142 may be located at an agent location 144, such as a home or work office, and the agent 142 may use a communication device 140 (e.g., a mobile phone, desktop computer, tablet, etc.) to communicate with the communication device 150 of the contact 152. The contact center service 110 may receive the request from the communication device 150 associated with the contact 152, and the contact center service 110 may add the contact 152 to queue(s) 136 of contacts that are waiting to communicate with available agent(s) 142. Further, the contact center service 110 may identify agent(s) 142 that are currently available to communicate with contact(s) 152 on the queue 136.

The contact center service 110 may identify the contacts 152 on the queue 136 and the agent(s) 142 that are currently available to communicate with contact(s) 152 on the queue 136. The contact center service 110 may identify the contacts 152 on the queue 136 and the available agents 142 on a periodic basis, such as every 50 milliseconds, 100 milliseconds, 500 milliseconds, 1 second, 5 seconds, 10 seconds, 30 seconds, etc. The contact center service 110 may initiate a process for matching the contacts 152 on the queue 136 to the available agents 142 based in part on agent attributes associated with the agents 142 and contact attributes associated with the contacts 152.

For example, the contact center service 110 may generate a weighted bipartite graph 120 that includes agent nodes 122 and contact nodes 124. The agent nodes 122 may correspond to the agents 142 that are available, and the contact nodes 124 may correspond to the contacts 152 included in the queue(s) 136. The weighted bipartite graph 120 may include edges between the agent nodes 122 and the contact nodes 124. For example, one agent node 122 may be connected via an edge with each of the contact nodes 124 in the weighted bipartite graph 120. Similarly, one contact node 124 may be connected via an edge with each of the agent nodes 122 in the weighted bipartite graph 120. The agent nodes 122 may not be connected to each other in the weighted bipartite graph 120, and the contact nodes 124 may not be connected to each other in the weighted bipartite graph 120.

In one example, the contact center service 110 may determine edge weightings 126 for the edges in the weighted bipartite graph 120. The contact center service 110 may determine the edge weightings 126 using the machine learning model 132. For example, the contact center service 110 may identify the agent attributes corresponding to the agent(s) 142 and the contact attributes corresponding to the contact(s) 152. The contact center service 110 may provide the agent attributes and the contact attributes as inputs or features to the machine learning model 132 to produce the edge weightings 126 as an output of the machine learning model 132. The edge weightings 126 may represent a predicted interaction metric between the agents 142 associated with the agent nodes 122 and the contacts 152 associated with the contact nodes 124.

The predicted interaction metric may include a predicted average handle time, a predicted first call resolution score, a predicted customer satisfaction score, a predicted sales conversion score, a predicted review score, etc. In other words, based on attributes of a particular agent 142 and attributes of a particular contact 152, the machine learning model 132 may output a predicted interaction metric (e.g., average handle time, first call resolution score, customer satisfaction score or sales conversion score) that represent an expected outcome if the particular agent 142 were to communicate with the particular contact 152. The predicted interaction metric may be represented by the edge weighting 126 of an edge between the agent node 122 associated with that particular agent 142 and the contact node 124 associated with that particular contact 152. In one example, the edge weighting may be a numerical value (e.g., a numerical value between 0 and 100), where a decreased value indicates an unfavorable predicted interaction metric and an increased value indicates a favored predicted interaction metric, or vice versa. The edge weighting may also be an alphabetic weighting (e.g., A-H), an alpha-numeric weighting (e.g., A1-H99) or any other type of weighting designation.

In one example, the machine learning model 132 may have been previously built and trained to determine predicted interaction metrics based on training data consisting of agent attributes and contact attributes. In other words, the machine learning model 132 may be trained to determine that agents 142 having certain agent attributes who communicate with contacts 152 having certain contact attributes may be likely to result in a certain interaction metric. In some cases, the machine learning model 132 may be trained to determine agents 142 and contacts 152 having similar or overlapping attributes or characteristics may result in improved interaction metrics, whereas agents 142 and contacts 152 having dissimilar or non-overlapping attributes or characteristics may result in degraded interaction metrics.

The contact center service 110 may determine selected agent-contact pairs 138 using the edge weightings 126 from the weighted bipartite graph 120. Each selected agent-contact pair 138 may be a unique pair with respect to other selected agent-contact pairs 138. More specifically, the contact center service 110 may determine the selected agent-contact pairs 138 by applying matching rules 134 to the weighted bipartite graph 120 using a matching rule engine. The edge weightings 126 may be considered as inputs or features to the matching rule engine to determine the selected agent-contact pairs 138 using the matching rules 134. The matching rules 134 may be associated with the matching rule engine or a matching process including, but not limited to, an assignment solver process, a minimum cost flow process or a maximum cost flow process.

The matching process may execute to identify certain agent-contact pairs 138 one-by-one until the agent-contact pairs 138 are determined for the weighted bipartite graph 120. For instance, the selection may be made based on finding a sum of the edge weightings 126 for the selected agent-contact pairs 138 that is a maximum or minimum value, depending on a desired interaction metric. The contact center service 110 may apply the matching rules 134 on an entire batch of agent nodes 122 and contact nodes 124 included in the weighted bipartite graph 120. Based on the matching rules 134, contacts 152 in the queue 136 may be matched with available agents 142, such that the selected agent-contact pairs 138 may result in an overall improved interaction metric between the agents 142 and the contacts 152. More specifically, based on the edge weightings 126 derived from the agent attributes and the contact attributes, certain contacts 152 may be intelligently routed to certain agents 142 to achieve the improved interaction metric.

In one example, the contact center service 110 may route communications between the contacts 152 and the agents 142 or transmit a routing assignment to an external communication service for establishing communications between the contacts 152 and the agents 142 in accordance with the selected agent-contact pairs 138. For example, based on a specific agent-contact pair 138 consisting of the agent 142 and the contact 152, a communication may be established or routed between the communication device 140 of the agent 142 and the communication device 150 of the contact 152. As an example, the communication devices 140, 150 may be mobile devices, and the communication between the communication devices 140, 150 may be a voice-based communication. As another example, the communication devices 140, 150 may be desktop computers, and the communication between the communication devices 140, 150 may be a text-based communication.

In one example, after a communication concludes between an agent 142 and a contact 152 included in a defined or selected agent-contact pair 138, the contact center service 110 may receive feedback information from the agent 142 and/or the contact 152. The feedback information from the contact 152 may include interaction metric information regarding customer satisfaction, sales conversions, etc., and the feedback information may be used for additional training of the machine learning model 132.

As a non-limiting detailed example, a first contact may call a computer repair help desk for support in fixing a software issue on a computer. When the first contact initially calls the computer repair help desk, at a first time point, no agents may be available to help the first contact. The first contact may be placed in a queue 136 of contacts that are waiting to speak to an available agent. At a second time point, a second contact may call the computer repair help desk and may be placed in the queue 136. At a third time point, a first agent at the computer repair help desk may become available, and at a fourth time point, a second agent at the computer repair help desk may become available. Then, the computer repair help desk may use the contact center service 110 to match contacts 152 that are waiting in a queue 136 with available agents 142. For example, the contact center service 110 may identify the two contacts and the two available agents, and build a weighted bipartite graph 120 that includes two agent nodes corresponding to the agents and two contact nodes corresponding to the contacts. In the weighted bipartite graph 120, a first agent node may have a first edge with a first contact node and a second edge with a second contact node, and a second agent node may have a third edge with the first contact node and a fourth with the second contact node.

Continuing with the non-limiting detailed example, the contact center service 110 may determine, using the machine learning model 132, four edge weightings corresponding to the four edges in the weighted bipartite graph 120. More specifically, the contact center service 110 may identify agent attributes associated with the two agents and contact attributes associated with the two contacts, and provide these attributes as inputs or features to the machine learning model 132, which may produce the four edge weightings as an output.

The contact center service 110 may use the matching rules 134 or a second machine learning model to determine the selected agent-contact pairs 138 using the four edge weightings. For example, the contact center service 110 may determine a first pair that consists of the first agent and the second contact, and a second pair that consists of the second agent and the first contact, where the contact center service 110 may determine that such selected pairs may result in an overall improved interaction metric between the agents 142 and the contacts 152. Based on the two selected pairs, the contact center service 110 may establish or route a first communication between the first agent and the second contact, and establish or route a second communication between the second agent and the first contact.

In past solutions, contacts intending to communicate with agents may by placed on a queue with other waiting contacts. When an agent becomes available, the contact that has been waiting on the queue a longest period of time may be matched with the available agent. For example, the queue may be a first-in, first-out (FIFO) queue, in which a contact that has been waiting a longest period of time as compared to other contacts on the queue may be first in line to be matched with a next available agent. However, such past solutions do not consider attributes of the contacts and attributes of the agents when matching contacts to available agents. As a result, in past solutions, matches between agents and contacts may result in poor interaction metrics, such as poor average handle times, poor first call resolution scores, poor customer satisfaction scores, poor sales conversion scores, etc. In other words, in the past, agents that were poorly equipped to handle certain issues or interact with contacts having certain attributes may have been matched with such contacts, thereby resulting in the poor interaction metrics.

In the present technology, the attributes of the agents and the attributes of the contacts may be considered when matching agents with contacts. The matching may be performed based on results from a machine learning model, which may be trained to determine weightings or values for predicted interaction metrics based on combinations of agents having certain attributes and contacts having certain attributes. As a result, agents may be matched with contacts having similar attributes or based on some other criteria, such that the matches between the agents and contacts may result in improved interaction metrics. In other words, based on the machine learning, a determination may be made that a certain agent-contact pair would likely result in an unfavorable interaction metric, and instead, selecting another agent-contact pair would likely result in a favorable or an improved interaction metric. The selected agent-contact pairs having the favorable or the improved interaction metrics may be determined for each time period or each processed weighted bipartite graph. Therefore, in the present technology, contacts may be matched with agents that are better equipped and have suitable attributes to efficiently and effectively handle the needs of the contacts.

In one example, a number of agent nodes 122 and a number of contact nodes 124 may be unequal to each other. For example, the queue 136 may have 100 contacts that are waiting to speak to available agents. Since there may not be 100 available agents at a given time when building the weighted bipartite graph 120, the contact center service 110 may wait until there are 40 available agents to build the weighted bipartite graph 120. In this case, 60 contacts may remain waiting in the queue 136, and the weighted bipartite graph 120 may be built with 40 agent nodes corresponding to the 40 available agents and 40 contact nodes corresponding to 40 contacts out of the 100 contacts that are waiting to speak to available agents. Further, 40 agent-contact pairs 138 may be selected, and the 60 remaining contacts may wait until additional agents become available. In this example, the queue 136 may be a FIFO queue, such that the 40 contacts that are initially selected to build the 40 contact nodes may have been placed on the queue 136 earlier in time as compared to the 60 remaining contacts that are waiting on the queue 136 until a next weighted bipartite graph 120 is built. Alternatively, a priority queue may be used to prioritize contacts that may match better with the currently available agents during a time period or time slot.

In one example, the number of agent nodes 122 and the number of contact nodes 124 may be limited to be below a defined threshold, which may reduce complexity when building the weighted bipartite graph 120 and applying the matching rules 134 to the weighted bipartite graph 120. The number of agent nodes 122 and the number of contact nodes 124 may be limited prior to generating a weighted bipartite graph 120. In another example, the agent nodes 122 and the contact nodes 124 may be divided into sub-groups of agent nodes 122 and contact nodes 124 having a size that is below the defined threshold. The agent nodes 122 and the contact nodes 124 may be divided into the sub-groups for processing prior to generating a weighted bipartite graph 120. As a non-limiting example, the queue 136 may include a total of 100 contacts and 100 agents may be picked to service those contacts, and then the queue 136 may be divided into five sub-groups each consisting of 20 contacts and 20 agents, which may reduce the computational complexity.

In one example, the contact center service 110 may place contacts 152 onto separate queues 136 depending on topics of interest (e.g., software assistance, hardware assistance). For example, a first queue may be created for software assistance, a second queue may be created for hardware assistance, and so on. Therefore, in this specific example, the contact center service 110 may generate disparate weighted bipartite graphs 120 that correspond to the disparate topics of interest. For example, the contact center service 110 may generate a first weighted bipartite graph for contacts 152 waiting on the first queue for software assistance, a second weighted bipartite graph for contacts 152 waiting on the second queue for hardware assistance, and so on.

In one example, the contact center service 110 may periodically initiate a process for building the weighted bipartite graph 120 and routing the communications based on the selected agent-contact pairs 138 once a certain batch size has been met. For example, the contact center service 110 may wait until a defined number of contacts 152 are waiting on the queue 136 and until a defined number of agents 142 are available. Alternatively, the contact center service 110 may wake up at a predefined interval (e.g., 10 seconds, 30 seconds, etc.) and run the process with the contacts 152 that are waiting on the queue 136 and the available agents 142, irrespective of the number of contacts 152 and the number of agents 142.

In one example, the contact center service 110 may generate a graph that includes the agent nodes 122 and contact nodes 124, where the graph may be a simple graph, undirected or directed graph, cyclic or acyclic graph, labeled graph, etc.

In another example, the contact center service 110 may not generate a weighted bipartite graph 120, but rather may generate weighted associations to determine the selected agent-contact pairs 138. For example, the contact center service 110 may generate weighted associations that include agents 142 and contacts 152. The contact center service 110 may convert associations between the agents 142 and the contacts 152 to weighted associations by predicting weightings of those associations using the machine learning model 132. Further, the contact center service 110 may determine the selected agent-contact pairs 138 using the weightings from the weighted associations.

Figure 2:
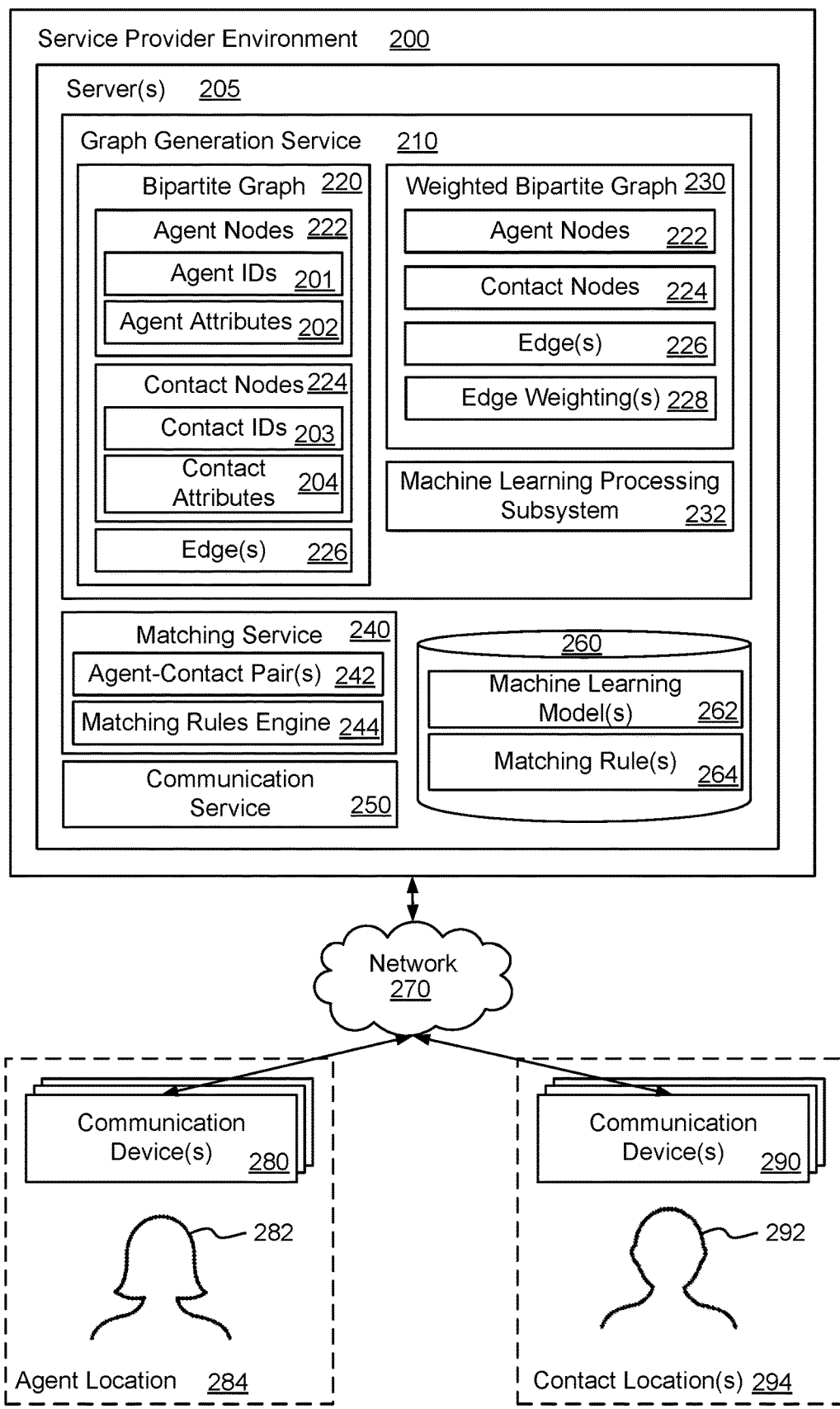
FIG. 2 is an illustration of a networked system for determining selected pairs of agents and contacts using edge weightings from a weighted bipartite graph and routing communications in accordance with the selected pairs of agents and contacts according to an example of the present technology.

FIG. 2 illustrates example components of the present technology in a service provider environment 200. The service provider environment 200 may include server(s) 205 operable to determine the selected agent-contact pairs 242 using edge weightings 228 from a weighted bipartite graph 230 and route communications in accordance with the selected agent-contact pairs 242. For example, the server 205 may use the selected agent-contact pairs 242 to route communications between communication devices 290 associated with contacts 292 at a contact location 294 and communication devices 280 associated with agents 282 at an agent location 284. The selected agent-contact pairs 242 may be determined using a matching process with matching rules 264 and stored in a data store 260 accessible to the server 205. Further, the server 205, the communication devices 280 associated with the agents 282, and the communication devices 290 associated with the contacts may communicate with each other over a network 270.

The server 205 may utilize a number of services for determining selected agent-contact pairs 242 and routing communications based on the selected agent-contact pairs 242. For example, the server 205 may operate a graph generation service 210, a matching service 240, a communication service 250, and other applications, modules, processes, systems, engines, or functionality not discussed in detail herein.

The graph generation service 210 may identify contacts 292 on a queue that are waiting to communicate with available agents 282. The contacts 292 may be associated with contact identifiers (IDs) 203. A contact identifier 203 may be a phone number associated with a contact 292, an Internet Protocol (IP) address associated with a communication device 290 used by the contact 292, a name of the contact 292, a user name of the contact 292, an electronic mail address of the contact 292, an account number of the contact 292, etc. Further, the graph generation service 210 may identify the agents 282 who are currently available to communicate with the contacts 292, as well as agent identifiers (IDs) 201 associated with the agents 282. An agent identifier 202 may be a phone number associated with an agent 282, an IP address associated with a communication device 280 used by the agent 282, a name of the agent 282, a user name of the agent 282, an electronic mail address of the agent 282, etc.

In one example, the graph generation service 210 may generate a bipartite graph 220. The bipartite graph 220 may include agent nodes 222 corresponding to the agents 282 and the agent identifiers 201. The bipartite graph 220 may further include contact nodes 224 corresponding to the contacts 292 and the contact identifiers 203. In other words, the agent nodes 222 may correspond to agents 282 that are available and the contact nodes 224 may correspond to contacts 292 who intend to communicate with the agents 282. The bipartite graph 220 may include edges 226 between the agent nodes 222 and the contact nodes 224. In one specific example, each agent node 222 may have an edge 226 with each contact node 224 in the bipartite graph 220.

In one example, the graph generation service 210 may obtain contact attributes 204 associated with the contact nodes 224, where the contact attributes 204 may correspond to a contact identifier 203 of a contact 292 waiting to communicate with an agent 282. The contact attributes 204 may include, but are not limited to, technical skills of the contact 292, interests of the contact, 292, an occupation of the contact 292, a geographic region associated with the contact 292, language skills possessed by the contact 292, etc. The contact attributes 204 may further include a type of queue in which the contact 292 is placed in, such as a first queue for hardware support, a second queue for software support, etc. Accordingly, the contact attributes 204 may describe or indicate an intent of the contact 292 or a reason that the contact 292 wishes to speak to the agent 282 (e.g., billing help, payment questions). In one example, the graph generation service 210 may receive the contact attributes 204 from the communication device 290 associated with the contact 292. For example, a user interface may be presented to the communication device 290, in which the contact 292 may provide certain information about the contact 292 and a nature of the communication (e.g., technical support). In a specific example, the contact attributes 204 may be received from the communication device 290 during an interactive voice response (IVR) session, in which the contact 292 may provide the contact attributes 204 verbally or through an interface of the communication device 290 (e.g., a graphical user interface displayed by the communication device 290 or by using a keypad or touchpad on the communication device 290). In other words, the contact attributes 204 may be collected using an IVR service that facilitates communications between agents 282 and contacts 292. Alternatively or additionally, the contact attributes 204 may have been previously obtained and stored in the data store 260, and the contact attributes 204 may be retrieved from the data store 260 based on the contact identifier 203 (e.g., phone number, electronic mail address).

The graph generation service 210 may further obtain agent attributes 202 associated with the agent nodes 222, where the agent attributes 202 may correspond to an agent identifier 201 of an available agent 282. The agent attributes 202 may include, but are not limited to, age, technical skills, interests, geographic region, language skills, etc. The agent attributes 202 may further include disparate queues for which the agent 282 is skilled to handle communications with certain groups or classes of contacts 292. For example, a specific agent 282 may be skilled to handle communications from contacts 292 in a first queue related to hardware support. In another example, a specific agent 282 may be skilled to handle communications from contacts 292 in both the first queue and a second queue related to software support. The graph generation service 210 may receive the agent attributes 202 from the communication device 280 associated with the agent 282. Alternatively or additionally, the agent attributes 202 may have been previously obtained and stored in the data store 260, and the agent attributes 202 may be retrieved from the data store 260 based on the agent identifier 201.

In one example, the graph generation service 210 may provide the agent attributes 202 associated with the agents 282 and the contact attributes 204 associated with the contacts 292 as inputs or features to a machine learning model 262. The machine learning model 262 may receive the inputs or features and produce edge weightings 228 as an output. More specifically, the graph generation service 210 may include a machine learning processing subsystem 232 to process the inputs or features using the data in the machine learning model 262 and determine the edge weightings 228 based on the outputs received from using the machine learning model 262. The graph generation service 210 may construct a weighted bipartite graph 230 that includes the edge weightings 228. The weighted bipartite graph 230 may include the agent nodes 222, the contact nodes 224, and the edges 226 between the agent nodes 222 and the contact nodes 224. The weighted bipartite graph 230 may include the edge weightings 228 for the edges 226 between the agent nodes 222 and the contact nodes 224. Based on the agent attributes 202 and the contact attributes 204, the machine learning model 262 may output an edge weighting 228 for each edge 226 between an agent node 222 and a contact node 224 in the weighted bipartite graph 230, where a specific edge weighting 228 may indicate a predicted interaction metric between a specific agent 282 and a specific contact 292. The predicted interaction metric may include a predicted average handle time, a predicted first call resolution score, a predicted customer satisfaction score, a predicted sales conversion score, etc.

In one example, the machine learning model 262 may be generated using supervised learning, unsupervised learning or reinforcement learning. The machine learning model 262 may apply feature learning, sparse dictionary learning, anomaly detection, decision trees, association rules, heuristic rules, etc. to improve a performance of the machine learning model over time. In addition, the machine learning model 262 may incorporate statistical models (e.g., regression), collaborative filtering, principal component analysis, neural networks, clustering, random tree forests, or any other type of artificial intelligence (AI).

The matching service 240 may apply the matching rules 264 to the weighted bipartite graph 230 using a matching rules engine 244 to determine the selected agent-contact pairs 242. For example, the matching service 240 may identify the edge weightings 228 on the weighted bipartite graph 230 as inputs to the machine rules engine 244, and apply the matching rules 264 to the edge weightings 228 to determine the selected agent-contact pairs 242. The matching rules 264 may be associated with the matching rules engine 244 or a matching process including, but not limited to, an assignment solver process, a minimum cost flow process or a maximum cost flow process. The selected agent-contact pairs 242 may be unique pairs, such that one agent 282 that is matched to one contact 292 is not matched to any other contacts 292, and vice versa. The selected agent-contact pairs 242 may correspond to overall improved interaction metrics for a group or batch of agents 282 and contacts 292. In some cases, a match between a certain contact 292 and a certain agent 282 may be expected to result in an improved interaction metric (e.g., an improved average handle time, an improved first call resolution, an improved customer satisfaction score, an improved sales conversion score, etc.), as compared to if the certain contact 292 was matched to another available agent 282.

The communication service 250 may establish or route communications between the communication devices 290 of the contacts 292 and the communication devices 280 of the agents 282. For example, the communication service 250 may receive or identify the selected agent-contact pairs 242. A given agent-contact pair 242 may include device identifiers associated with the communication devices 280, 290, and based on the device identifiers, the communication service 250 may establish or route the communications between the communication devices 280, 290. In another example, the communication service 250 may receive a communication assignment from the graph generation service 210 or the matching service 240, and the communication assignment may enable the communication service 250 to establish communications between the contacts 292 and the agents 282 in accordance with the agent-contact pairs 242.

The communication devices 280, 290 may be, for example, processor-based systems. The communication devices 280, 290 may be devices such as, but not limited to, mobile devices, tablet computers, laptops or notebook computers, handheld computers, desktop computers, mainframe computer systems, workstations, network computers, desktop phones, or other devices with like capability.

The various processes and/or other functionality contained within the service provider environment 200 may be executed on one or more processors that are in communication with one or more memory modules. The service provider environment 200 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 270 may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 2 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An application programming interface (API) may be provided for each module to enable a second module to send requests to and receive output from the first module. Such APIs may also allow third parties to interface with the module and make requests and receive output from the modules. While FIG. 2 illustrates an example of a system that may implement the techniques above, many other similar or different environments are possible. The example environments discussed and illustrated above are merely representative and not limiting.

Figure 3:
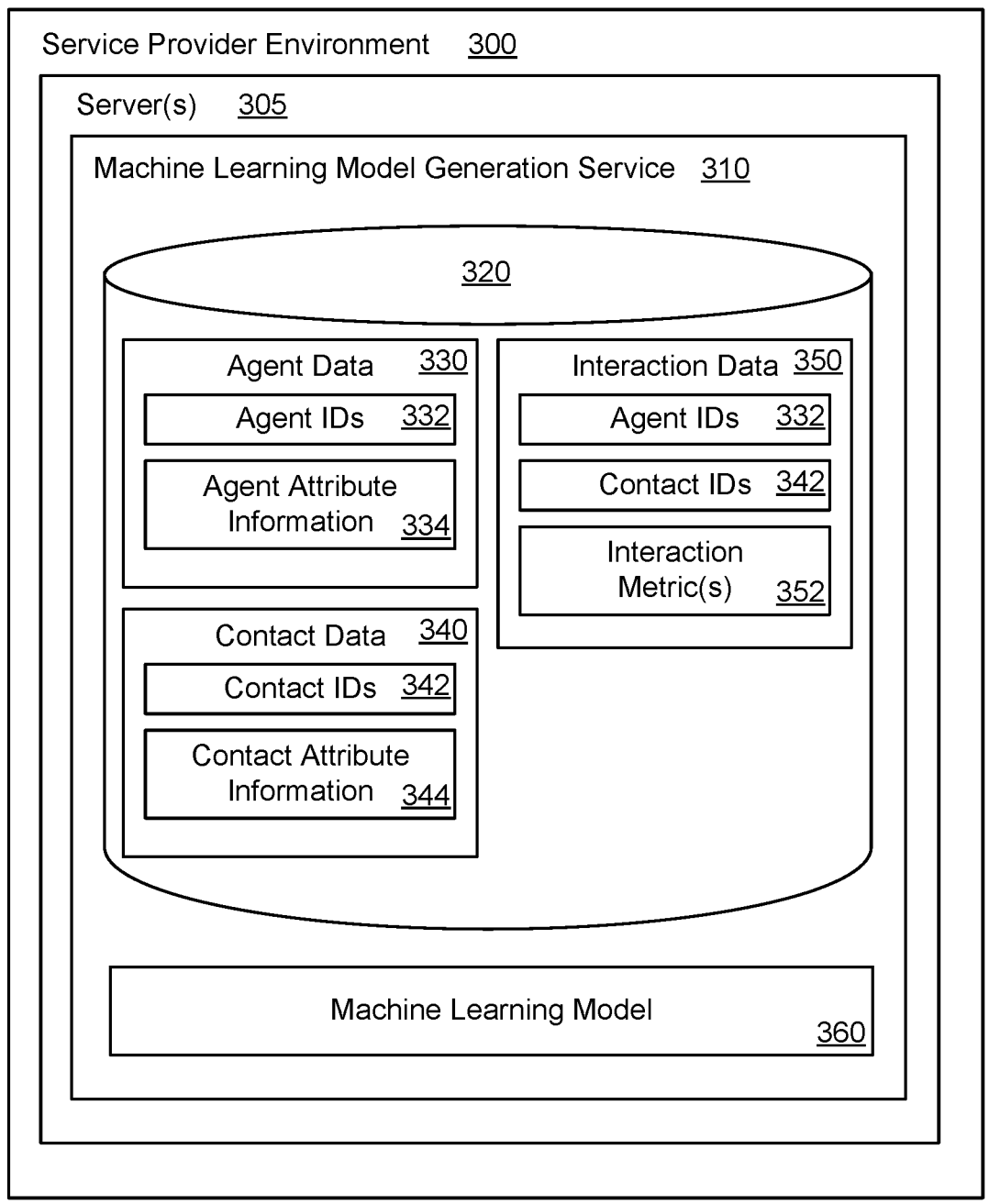
FIG. 3 illustrates a system and related operations for building and training a machine learning model for an interaction metric using agent data, contact data and interaction data according to an example of the present technology.

FIG. 3 illustrates an example of system and related operations for building and training a machine learning model 360 for a type of interaction metric 352 using agent data 330, contact data 340 and interaction data 350 stored in a data store 320. A machine learning model generation service 310 that operates on server(s) 305 of a service provider environment 300 may build and train the machine learning model 360 for the type of interaction metric 352, which may be an average handle time, a first call resolution score, a customer satisfaction score, a sales conversion score or another interaction metric or result metric. In other words, in one example, a first machine learning model may be built to predict a first interaction metric or weighting, a second machine learning model may be built to predict a second interaction metric or weighting, and so on. After the machine learning model 360 is built and trained, the machine learning model 360 may be deployed to determine predicted interaction metrics based on received inputs or features of agent attributes and contact attributes.

In one example, the interaction metrics 352 may be determined using the server(s) 305 in the service provider environment 300. For example, interaction metrics 352 such as average handle time, number of transfers, number of holds, etc. may be determined by the server 305, since ground truth interaction metrics may be populated in the interaction data 350 after communications between agents and contacts ends. In another example, the interaction metrics 352 may be received from a customer. For example, the customer may determine certain interaction metrics 352 (e.g., a sales conversion score, a customer satisfaction score, a supervisor's review score) after communications between agents and contacts ends, and the customer may provide those interaction metrics 352 to the server 305.

In a specific example, the machine learning model generation service 310 may execute a code function to retrieve the agent data 330, the contact data 340 and the interaction data 350 from the data store 320. The code function may be a portion of code that may be executed in the service provider environment 300. For example, the code function may be executed on a subsystem that includes hardware and/or software elements for providing a code function execution service to enable execution of the code function. The code function may be a segment of code that is capable of receiving parameters, processing data, and returning values. The code functions may be written in a high level programming language and/or a scripting language. Further, the code function may be a function that is instantiated in a container hosted in the service provider environment 300.

In one example, the agent data 330 may include a plurality of agent identifiers (IDs) 332 corresponding to agents. For example, the agents may be employees of a call center that provides customer service. The agent data 330 may include agent attribute information 334 corresponding to the plurality of agent identifiers 332. For example, for a given agent identifier 332 associated with a given agent, the agent data 330 may include a historical interaction metric (e.g., an average handle time, in minutes) when the agent communicates with contacts placed on a first queue (e.g., a queue for handling retail returns), the historical interaction metric when the agent communicates with contacts placed on a second queue (e.g., a queue for handling retail exchanges), the historical interaction metric when the agent performs text-based communications, the historical interaction metric when the agent performs voice-based communications, etc. Further, the agent data 330 may include demographical information for the given agent identifier 332 associated with the given agent, such as age, language, etc.

In one example, the contact data 340 may include a plurality of contact identifiers (IDs) 342 corresponding to contacts. For example, the contacts may wish to communicate with the agents at the call center to receive customer service. The contact data 340 may include contact attribute information 344 corresponding to the plurality of contact identifiers 342. For example, for a given contact identifier 342 associated with a given contact, the contact data 340 may include a queue associated with the contact (e.g., a first queue related to retail returns or a second queue related to retail exchanges), a type of communication channel initiated by the contact (e.g., a voice-based communication or a text-based communication), a geographical region of the contact, language skills of the contact, etc. Further, the contact data 340 may include demographical information for the given contact identifier 342 associated with the given contact, such as age, gender, occupation, etc.

In one example, the interaction data 350 may be for the plurality of agent identifiers 332 and the plurality of contact identifiers 342. The interaction data 350 may include a type of interaction metric 352 corresponding to interactions between agents associated with the agent identifiers 332 and contacts associated with the contact identifiers 342. For example, the interaction data 350 may include, for a given agent-contact pair, a historical interaction metric (e.g., an average handle time, in minutes).

In one example, the machine learning model generation service 310 may receive the agent data 330, the contact data 340, the interaction data 350 and/or the customer-defined interaction data 355, and build and train the machine learning model 360 using the agent data 330, the contact data 340 and the interaction data 350. The machine learning model generation service 310 may build and train the machine learning model 360 during an offline process. In addition, the machine learning model generation service 310 may continue to receive additional agent data 330, additional contact data 340 and additional interaction data 350 over time, and the machine learning model generation service 310 may refine and update the machine learning model 360 in offline or online modes over time using the additional received data.

Figure 4:
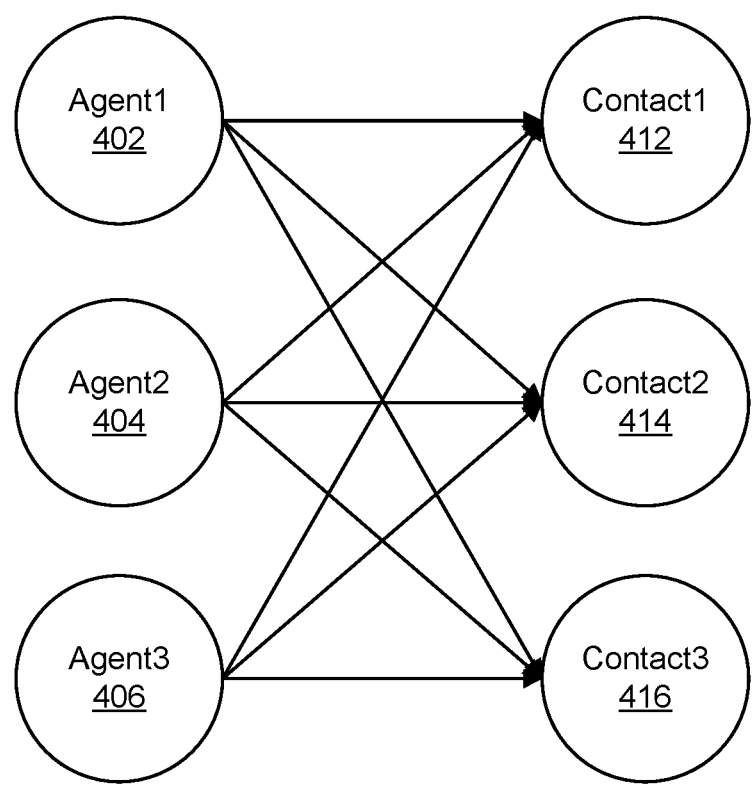
FIG. 4 illustrates an unweighted bipartite graph including agent nodes corresponding to agents and contact nodes corresponding to contacts according to an example of the present technology.

FIG. 4 illustrates an example of an unweighted bipartite graph including agent nodes corresponding to agents and contact nodes corresponding to contacts. In this example, the unweighted bipartite graph may include three agent nodes 402, 404, 406 (e.g., Agent1, Agent2 and Agent3) and three contact nodes 412, 414, 416 (e.g., Contact1, Contact2 and Contact3). The three agent nodes may be connected via an edge to each of the three contact nodes. For example, a first agent node 402 may be connected via a separate edge to each of the three contact nodes 412, 414, 416, a second agent node 404 may be connected via a separate edge to each of the three contact nodes 412, 414, 416, and a third agent node 402 may be connected via a separate edge to each of the three contact nodes 412, 414, 416. In one example, the unweighted bipartite graph may a fully connected bipartite graph, or alternatively, the unweighted bipartite graph may be a partially connected bipartite graph.

Figure 5:
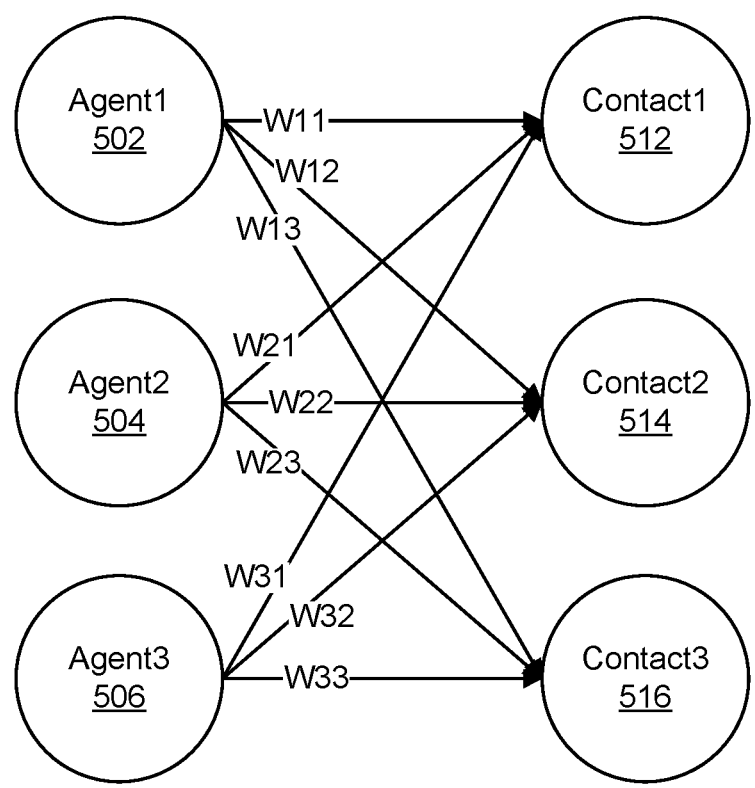
FIG. 5 illustrates a weighted bipartite graph having edge weightings according to an example of the present technology.

FIG. 5 illustrates an example of a weighted bipartite graph having edge weightings. In this example, the weighted bipartite graph may include three agent nodes 502, 504, 506 (e.g., Agent1, Agent2 and Agent3) and three contact nodes 512, 514, 516 (e.g., Contact1, Contact2 and Contact3). Edges between the three agent nodes 502, 504, 506 and the three contact nodes 512, 514, 516 may have associated edge weightings. The edge weightings may be determined using a machine learning model. For example, agent attributes corresponding to the agents associated with the agent nodes 502, 504, 506 and contact attributes corresponding to the contacts associated with the contact nodes 512, 514, 516 may be provided to the machine learning model to produce the edge weightings. For example, an edge between a first agent node 502 and a first contact node 512 may have a first edge weighting (e.g., W11), an edge between the first agent node 502 and a second contact node 514 may have a second edge weighting (e.g., W12), and so on. In this example, the weighted bipartite graph may have nine edge weightings corresponding to the nine possible agent-contact pairs. The edge weightings may be numerical values within a certain range (e.g., numerical value between 0 and 100). Further, the edge weightings associated with edges between the three agent nodes 502 and the three contact nodes 512, 514, 516 may represent a predicted interaction metric between three agents associated with the three agent nodes 502 and three contacts associated with the three contact nodes 512, 514, 516.

Figure 6:
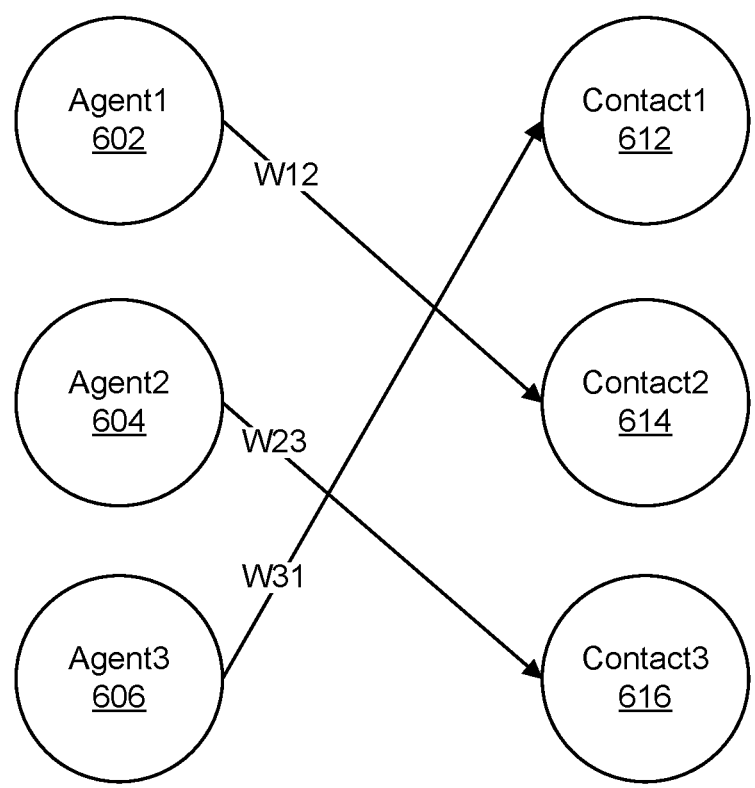
FIG. 6 illustrates selected pairs of agent nodes and contact nodes selected from a weighted bipartite graph according to an example of the present technology.

FIG. 6 illustrates an example of selected pairs of agent nodes and contact nodes selected from a weighted bipartite graph that includes three agent nodes 602, 604, 606 and three contact nodes 612, 614, 616. The selected pairs of agent nodes and contact nodes may be determined by applying matching rules or a matching process to the weighted bipartite graph using a matching rule engine. In this example, the selected pairs of agent nodes and contact nodes may include a first agent-contact pair consisting of a first agent node 602 and a second contact node 614, a second agent-contact pair consisting of a second agent node 604 and a third contact node 616, and a third agent-contact pair consisting of a third agent node 606 and a first contact node 612. The agent-contact pairs may be selected to improve an overall interaction metric with respect to the three agent nodes and the three contact nodes in the weighted bipartite graph. In other words, in this example, the selected first, second and third agent-contact pairs may be predicted to have an overall improved interaction metric as compared to other agent-contact pairs that could have been selected from the three agent nodes 602, 604, 606 and the three contact nodes 612, 614, 616.

Figure 7:
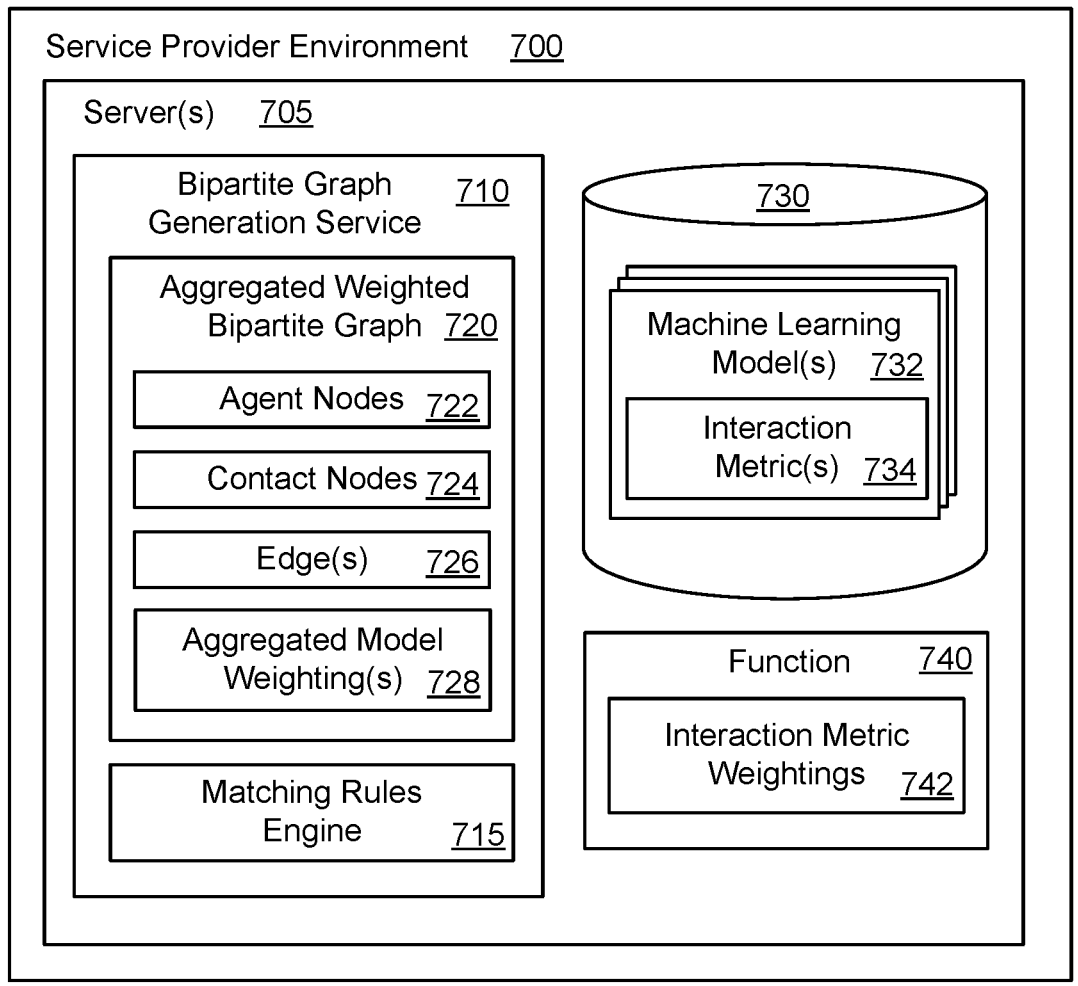
FIG. 7 illustrates a system and related operations for determining aggregated model weightings for an aggregated weighted bipartite graph using multiple machine learning models according to an example of the present technology.

FIG. 7 illustrates an example of a system and related operations for determining aggregated model weightings 728 for edges 726 in an aggregated weighted bipartite graph 720 using multiple machine learning models 732. A server 705 operating in a service provider environment 700 may receive a function 740 that includes interaction metric weightings 742. In other words, the function 740 may assign a weighting to multiple types of interaction metrics 734, where a given type of interaction metric 734 is associated with a specific machine learning model 732. The types of interaction metrics 734 may include, but are not limited to, an average handle time, a first call resolution score, a customer satisfaction score, a sales conversion score, etc. The multiple machine learning models 732 may be stored on a data store 730 that is accessible to the server 705. The server 705 may receive the function 740 from a customer via a user interface. For example, the function 740 may assign a first weighting to a first type of interaction metric, a second weighting to a second type of interaction metric, and a third weighting to a third type of interaction metric. In other words, the customer would like the function 740 to account for all three of the interaction metrics, but may assign different levels of importance (or weightings) to each of the three interaction metrics. The server 705 may further include a bipartite graph generation service 710 that generates the aggregated weighted bipartite graph 720 in accordance with the received function 740.

In one example, the bipartite graph generation service 710 may generate the aggregated weighted bipartite graph 720 to include agent nodes 722, contact nodes 724, and edges 726 between the agent nodes 722 and the contact nodes 724. Further, the bipartite graph generation service 710 may generate the aggregated model weightings 728 using outputs from the multiple machine learning models 732 and the received function 740. For example, the bipartite graph generation service 710 may receive first edge weightings as an output from a first machine learning model, second edge weightings as an output from a second machine learning model, and third edge weightings as an output from a third machine learning model. The bipartite graph generation service 710 may combine or aggregate the first edge weightings from the first machine learning model, the second edge weightings from the second machine learning model and the third edge weightings from the third machine learning model in accordance with the received function 740 to produce the aggregated model weightings 728 for the edges 726 in the aggregated weighted bipartite graph 720. Further, a matching rules engine 715 of the bipartite graph generation service 710 may determine selected agent-contact pairs by applying matching rules to the aggregated weighted bipartite graph 720 having the aggregated model weightings 728.

As a non-limiting example, a received function (F) may be equal to $10 \times CSAT + 12 \times SalesConversion - 1.5 \times AHT - 3 \times NumTransfers$, where CSAT represents a customer satisfaction score, SalesConversion represents a sales conversion score, AHT represents an average handle time, and NumTransfers represents a number of transfers. In this example, a first machine learning model trained for predicting customer satisfaction scores may be used, a second machine learning model trained for predicting sales conversion scores may be used, a third machine learning model trained for predicting average handle times may be used, and a fourth machine learning model trained for predicting a number of transfers may be used. Further, in this non-limiting example, the bipartite graph generation service 710 may receive a first edge weighting of 8 from the first machine learning model, a second edge weighting of 0.9 from the second machine learning model, a third edge weighting of 10 from the third machine learning model, and a fourth edge weighting of 1 from the fourth machine learning model. The bipartite graph generation service 710 may combine or aggregate the four edge weightings from the four machine learning models in accordance with the received function 740 to produce the aggregated model weighting 728 for an edge 726 in the aggregated weighted bipartite graph 720 (e.g., $10 \times 8 + 12 \times 0.9 + 1.5 \times 10 + 3 \times 1$, which is equal to an aggregated model weighting of 72.8). In this example, the aggregated model weighting of 72.8 may be applicable to a specific edge between an agent node and a contact node, and a similar process may be repeated for each of the edges between agent nodes and contact nodes in an aggregated weighted bipartite graph.

Figure 8:
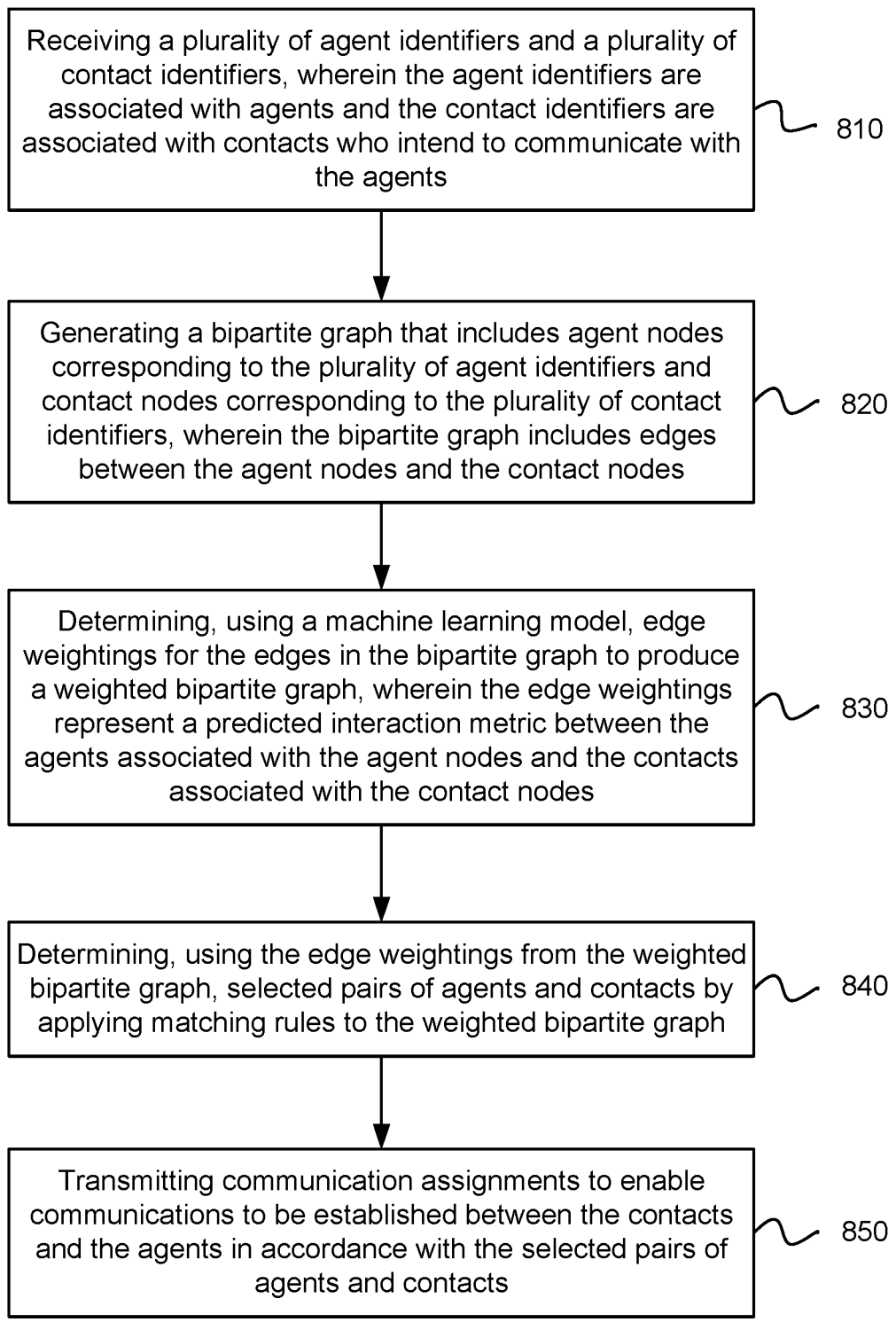
FIG. 8 is a flowchart of an example method for determining selected pairs of agents and contacts using edge weightings from a weighted bipartite graph and routing communications in accordance with the selected pairs of agents and contacts.

FIG. 8 illustrates an example of a method for determining selected pairs of agents and contacts using edge weightings from a weighted bipartite graph and routing communications in accordance with the selected pairs of agents and contacts. A plurality of agent identifiers and a plurality of contact identifiers may be identified, as in block 810. The agent identifiers may be associated with agents and the contact identifiers may be associated with contacts who intend to communicate with the agents. For example, communication requests may be received from contacts associated with the contact identifiers, and the agents that are available to communicate with the contacts may be identified.

A bipartite graph may be generated that includes agent nodes corresponding to the plurality of agent identifiers and contact nodes corresponding to the plurality of contact identifiers, as in block 820. The bipartite graph may include edges between the agent nodes and the contact nodes. For example, the bipartite graph may include a plurality of agent nodes and a plurality of contact nodes, and each of the plurality of agent nodes may be connected to each of the plurality of contact nodes via an edge.

Edge weightings for the edges in the bipartite graph may be determined using one or more machine learning models, as in block 830. For example, the edge weightings in the bipartite graph may be determined to produce a weighted bipartite graph. In other words, the weighted bipartite graph may include the plurality of agent nodes and the plurality of contact nodes, and edges connecting each of the plurality of agent nodes to each of the plurality of contact nodes may be associated with edge weightings. The edge weightings may represent a predicted interaction metric between the agents associated with the agent nodes and the contacts associated with the contact nodes. The predicted interaction metric may include, but is not limited to, an average handle time, a first call resolution score, a customer satisfaction score or a sales conversion score.

The selected pairs of agents and contacts may be determined using the edge weightings from the weighted bipartite graph, as in block 840. For example, a plurality of agent-contact pairs may be determined using the edge weightings from the weighted bipartite graph. The agent-contact pairs may be unique pairs of agents and contacts. In a more specific example, the selected pairs of agents and contacts may be determined by applying matching rules to the weighted bipartite graph. The matching rules may be associated with a matching process including, but not limited to, an assignment solver process, a minimum cost flow process or a maximum cost flow process.

Communication assignments may be transmitted to enable communications to be established between the contacts and the agents in accordance with the selected pairs of agents and contacts, as in block 850. For example, the communication assignments may be transmitted to an external or separate communication system to enable the communications to be established between the contacts and the agents in accordance with the selected pairs of agents and contacts. One communication assignment may be transmitted for a specific agent-contact pair. Communications may be routed between the contacts and the agents using the communication assignments in accordance with the selected pairs of agents and contacts. In one example, in response to the communication requests, the communications may be routed between the contacts and the agents using the selected pairs of agents and contacts. A communication between an agent and a contact may be a voice-based communication, a text-based communication, a visual communication (e.g., the agent takes control of the contact's computer), a computer network communication, or another type of communication.

Figure 9:
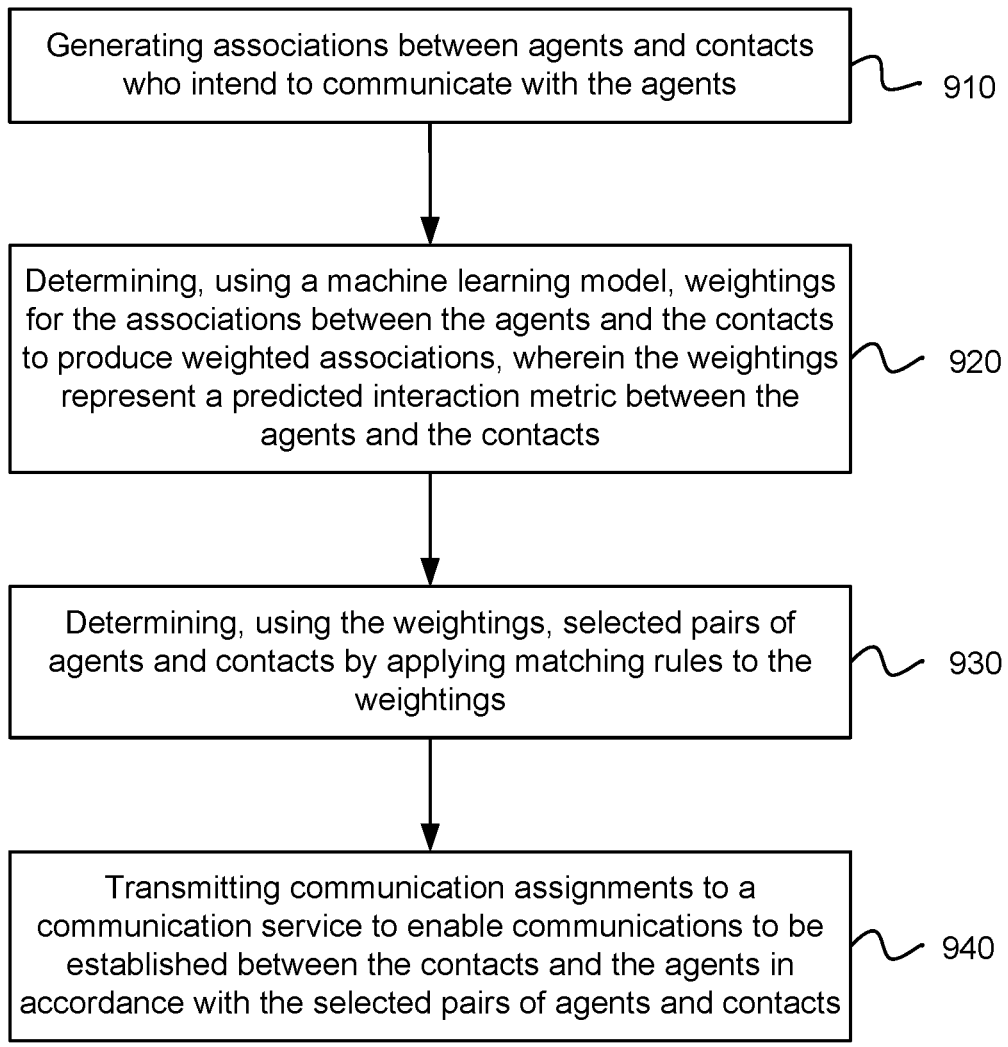
FIG. 9 is a flowchart of another example method for determining selected pairs of agents and contacts using weightings weighted associations and routing communications in accordance with the selected pairs of agents and contacts.

FIG. 9 illustrates an example of a method for determining selected pairs of agents and contacts using weightings from weighted associations and routing communications in accordance with the selected pairs of agents and contacts. The selected pairs of agents and contacts and the communication routing may be performed using a contact center service that operates in a service provider environment. Associations may be generated between agents and contacts who intend to communicate with the agents, as in block 910. In one example, the associations may be a graph, such as a bipartite graph. In another example, the associations may be represented in a table, linked memory locations, etc.

Weightings may be determined for the associations between the agents and the contacts using a machine learning model to produce weighted associations, as in block 920. The weighted associations may be a weighted graph, such as a weighted bipartite graph. The weightings may represent a predicted interaction metric between the agents and the contacts. In other words, a weighting may represent the predicted interaction metric between an agent having a set of agent attributes and a contact having a set of contact attributes.

Selected pairs of agents and contacts may be determined using the weightings from the weighted associations, as in block 930. In one example, the selected pairs of agents and contacts may be determined by applying matching rules or matching processes to the weighted associations. In another example, the weightings from the weighted associations may be provided to a second machine learning model to determine the selected pairs of agents and contacts.

Communication assignments may be transmitted to enable communications to be established between the contacts and the agents in accordance with the selected pairs of agent nodes and contact nodes, as in block 940. For example, based on a communication assignment, a communication request from a certain contact may be routed to an available agent in accordance with a selected agent-contact pair. As an example, a communication between an agent and a contact may be a voice-based communication or a text-based communication.

Figure 10:
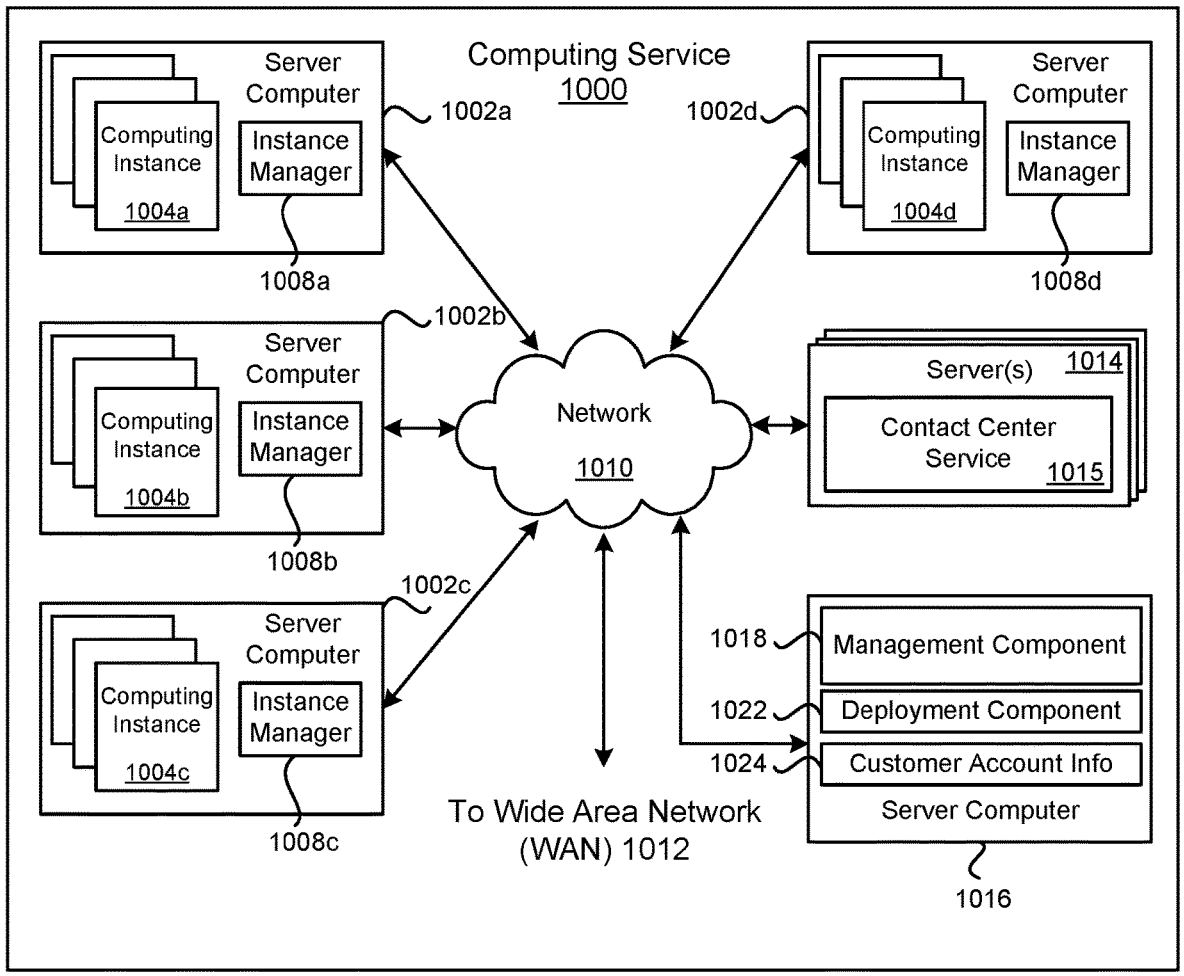
FIG. 10 is a block diagram of a service provider environment according to an example of the present technology.

FIG. 10 is a block diagram illustrating an example computing service 1000 that may be used to execute and manage a number of computing instances 1004*a-d* upon which the present technology may execute. In particular, the computing service 1000 depicted illustrates one environment in which the technology described herein may be used. The computing service 1000 may be one type of environment that includes various virtualized service resources that may be used, for instance, to host computing instances 1004*a-d*.

The computing service 1000 may be capable of delivery of computing, storage and networking capacity as a software service to a community of end recipients. In one example, the computing service 1000 may be established for an organization by or on behalf of the organization. That is, the computing service 1000 may offer a "private cloud environment." In another example, the computing service 1000 may support a multi-tenant environment, wherein a plurality of customers may operate independently (i.e., a public cloud environment). Generally speaking, the computing service 1000 may provide the following models: Infrastructure as a Service ("IaaS") and/or Software as a Service ("SaaS"). Other models may be provided. For the IaaS model, the computing service 1000 may offer computers as physical or virtual machines and other resources. The virtual machines may be run as guests by a hypervisor, as described further below.

Application developers may develop and run their software solutions on the computing service system without incurring the cost of buying and managing the underlying hardware and software. The SaaS model allows installation and operation of application software in the computing service 1000. End customers may access the computing service 1000 using networked client devices, such as desktop computers, laptops, tablets, smartphones, etc. running web browsers or other lightweight client applications, for example. Those familiar with the art will recognize that the computing service 1000 may be described as a "cloud" environment.

The particularly illustrated computing service 1000 may include a plurality of server computers 1002a-d. The server computers 1002a-d may also be known as physical hosts. While four server computers are shown, any number may be used, and large data centers may include thousands of server computers. The computing service 1000 may provide computing resources for executing computing instances 1004a-d. Computing instances 1004a-d may, for example, be virtual machines. A virtual machine may be an instance of a software implementation of a machine (i.e. a computer) that executes applications like a physical machine. In the example of a virtual machine, each of the server computers 1002a-d may be configured to execute an instance manager 1008a-d capable of executing the instances. The instance manager 1008a-d may be a hypervisor, virtual machine manager (VMM), or another type of program configured to enable the execution of multiple computing instances 1004a-d on a single server. Additionally, each of the computing instances 1004a-d may be configured to execute one or more applications.

A server 1014 may be reserved to execute software components for implementing the present technology or managing the operation of the computing service 1000 and the computing instances 1004a-d. For example, the server 1014 may include a contact center service 1015. The contact center service 1015 may include various micro-services, such as a graph generation service, a matching service, a communication service, a machine learning model generation service, etc., as described in FIGS. 2, 3 and 7. Such micro-services that are part of the contact center service 1015 may also run on separate server(s) 1014. The contact center service 1015 may generate a graph that includes agent nodes corresponding to agents and contact nodes corresponding to contacts who intend to communicate with the agents. The graph may include edges between the agent nodes and the contact nodes. The contact center service 1015 may determine, using a machine learning model, edge weightings for the edges in the graph to produce a weighted graph. The edge weightings may represent a predicted interaction metric between the agents and the contacts. The contact center service 1015 may determine, using the edge weightings from the weighted graph, selected pairs of agents and contacts by applying matching rules to the weighted graph. The contact center service 1015 may route communications between the contacts and the agents in accordance with the selected pairs of agent nodes and contact nodes.

A server computer 1016 may execute a management component 1018. A customer may access the management component 1018 to configure various aspects of the operation of the computing instances 1004a-d purchased by a customer. For example, the customer may setup computing instances 1004a-d and make changes to the configuration of the computing instances 1004a-d.

A deployment component 1022 may be used to assist customers in the deployment of computing instances 1004a-d. The deployment component 1022 may have access to account information associated with the computing instances 1004a-d, such as the name of an owner of the account, credit card information, country of the owner, etc. The deployment component 1022 may receive a configuration from a customer that includes data describing how computing instances 1004a-d may be configured. For example, the configuration may include an operating system, provide one or more applications to be installed in computing instances 1004a-d, provide scripts and/or other types of code to be executed for configuring computing instances 1004a-d, provide cache logic specifying how an application cache is to be prepared, and other types of information. The deployment component 1022 may utilize the customer-provided configuration and cache logic to configure, prime, and launch computing instances 1004a-d. The configuration, cache logic, and other information may be specified by a customer accessing the management component 1018 or by providing this information directly to the deployment component 1022.

Customer account information 1024 may include any desired information associated with a customer of the multi-tenant environment. For example, the customer account information may include a unique identifier for a customer, a customer address, billing information, licensing information, customization parameters for launching instances, scheduling information, etc. As described above, the customer account information 1024 may also include security information used in encryption of asynchronous responses to API requests. By "asynchronous" it is meant that the API response may be made at any time after the initial request and with a different network connection.

A network 1010 may be utilized to interconnect the computing service 1000 and the server computers 1002a-d, 1016. The network 1010 may be a local area network (LAN) and may be connected to a Wide Area Network (WAN) 1012 or the Internet, so that end customers may access the computing service 1000. In addition, the network 1010 may include a virtual network overlaid on the physical network to provide communications between the servers 1002a-d. The network topology illustrated in FIG. 10 has been simplified, as many more networks and networking devices may be utilized to interconnect the various computing systems disclosed herein.

Figure 11:
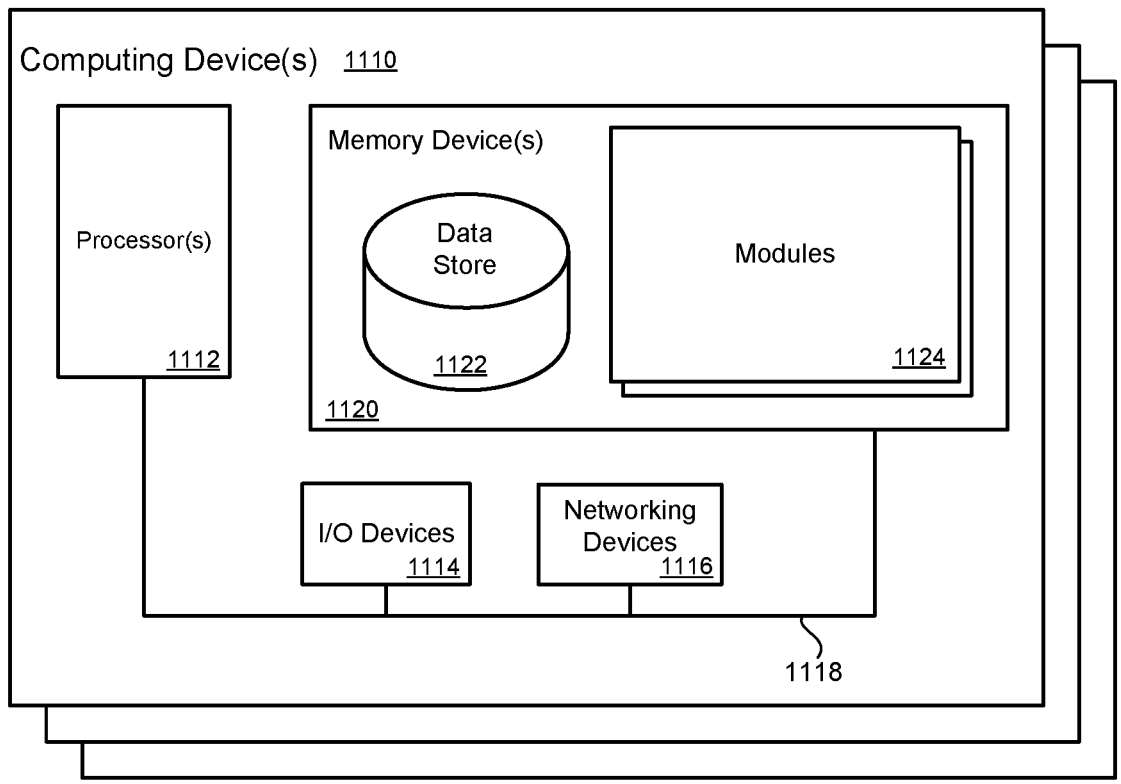
FIG. 11 is a block diagram that provides an example illustration of a computing device that may be employed in the present technology.

FIG. 11 illustrates a computing device 1110 on which modules of this technology may execute. The computing device 1110 is illustrated on which a high level example of the technology may be executed. The computing device 1110 may include one or more processors 1112 that are in communication with memory devices 1120. The computing device may include a local communication interface 1118 for the components in the computing device. For example, the local communication interface may be a local data bus and/or any related address or control busses as may be desired.

The memory device 1120 may contain modules 1124 that are executable by the processor(s) 1112 and data for the modules 1124. The modules 1124 may execute the functions described earlier. A data store 1122 may also be located in the memory device 1120 for storing data related to the modules 1124 and other applications along with an operating system that is executable by the processor(s) 1112.

Other applications may also be stored in the memory device 1120 and may be executable by the processor(s) 1112. Components or modules discussed in this description that may be implemented in the form of software using high programming level languages that are compiled, interpreted or executed using a hybrid of the methods.

The computing device may also have access to I/O (input/output) devices 1114 that are usable by the computing devices. An example of an I/O device is a display screen that is available to display output from the computing devices. Other known I/O device may be used with the computing device as desired. Networking devices 1116 and similar communication devices may be included in the computing device. The networking devices 1116 may be wired or wireless networking devices that connect to the internet, a LAN, WAN, or other computing network.

The components or modules that are shown as being stored in the memory device 1120 may be executed by the processor 1112. The term "executable" may mean a program file that is in a form that may be executed by a processor 1112. For example, a program in a higher level language may be compiled into machine code in a format that may be loaded into a random access portion of the memory device 1120 and executed by the processor 1112, or source code may be loaded by another executable program and interpreted to generate instructions in a random access portion of the memory to be executed by a processor. The executable program may be stored in any portion or component of the memory device 1120. For example, the memory device 1120 may be random access memory (RAM), read only memory (ROM), flash memory, a solid state drive, memory card, a hard drive, optical disk, floppy disk, magnetic tape, or any other memory components.

The processor 1112 may represent multiple processors and the memory 1120 may represent multiple memory units that operate in parallel to the processing circuits. This may provide parallel processing channels for the processes and data in the system. The local interface 1118 may be used as a network to facilitate communication between any of the multiple processors and multiple memories. The local interface 1118 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, random-access memory (RAM), read-only memory (ROM), electrically erasable programmable read-only memory (EEPROM), flash memory or other memory technology, compact disc read-only memory (CD-ROM), digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A non-transitory machine readable storage medium having instructions embodied thereon, the instructions when executed by one or more processors, cause the one or more processors to perform a process including:
receiving a plurality of agent identifiers and a plurality of contact identifiers, wherein the agent identifiers are associated with agents and the contact identifiers are associated with contacts who intend to communicate with the agents;
generating a bipartite graph that includes agent nodes corresponding to the plurality of agent identifiers and contact nodes corresponding to the plurality of contact identifiers, wherein the bipartite graph includes edges between the agent nodes and the contact nodes;
determining, using a machine learning model, edge weightings for the edges in the bipartite graph to produce a weighted bipartite graph, wherein the edge weightings represent a predicted interaction metric between the agents associated with the agent nodes and the contacts associated with the contact nodes;
determining, using the edge weightings from the weighted bipartite graph, selected pairs of agents and contacts by applying matching rules to the weighted bipartite graph; and
transmitting a communication assignment to a communication service to enable communications to be established between the contacts and the agents in accordance with the selected pairs of agents and contacts.

2. The non-transitory machine readable storage medium of claim 1, further comprising:
receiving agent data comprising the plurality of agent identifiers and corresponding agent attribute information;
receiving contact data comprising the plurality of contact identifiers and corresponding contact attribute information;
receiving interaction data for the plurality of agent identifiers and the plurality of contact identifiers, wherein the interaction data includes a type of interaction metric corresponding to interactions between agents associated with the agent identifiers and contacts associated with the contact identifiers; and
building and training the machine learning model for the type of interaction metric based in part on the agent data, the contact data and the interaction data.

3. The non-transitory machine readable storage medium of claim 1, further comprising:
generating the bipartite graph and determining the selected pairs from the weighted bipartite graph using a matching process that operates in a service provider environment.

4. The non-transitory machine readable storage medium of claim 1, further comprising:
identifying agent attributes corresponding to the agent identifiers;
identifying contact attributes corresponding to the contact identifiers; and
providing the agent attributes and the contact attributes as features to the machine learning model to produce the edge weightings as an output of the machine learning model.

5. A method, comprising:
generating a bipartite graph that includes agent nodes, contact nodes, and edges between the agent nodes and the contact nodes, wherein the agent nodes correspond to agent identifiers associated with agents and the contact nodes correspond to contact identifiers associated with contacts;
determining, using a machine learning model, edge weightings for the edges to produce a weighted bipartite graph, wherein the edge weightings represent a predicted interaction metric between the agents and the contacts;
determining, using the edge weightings, selected pairs of agents and contacts by applying matching rules to the weighted bipartite graph; and
transmitting a communication assignment to enable communications to be established between the contacts and the agents in accordance with the selected pairs of agents and contacts.

6. The method of claim 5, further comprising:
receiving, from a data store, agent data comprising a plurality of agent identifiers and corresponding agent attribute information;
receiving, from the data store, contact data comprising a plurality of contact identifiers and corresponding contact attribute information;
receiving, from the data store, interaction data for the plurality of agent identifiers and the plurality of contact identifiers, wherein the interaction data includes a type of interaction metric corresponding to interactions between the agents associated with the agent identifiers and the contacts associated with the contact identifiers; and
building the machine learning model for the type of interaction metric based in part on the agent data, the contact data and the interaction data.

7. The method of claim 5, further comprising:
receiving, from a data store, contact data comprising contact attribute information, wherein the contact data is collected using an interactive voice response (IVR) service that facilitates communications between the agents and the contacts; and
building the machine learning model for the type of interaction metric based in part on the contact data.

8. The method of claim 6, further comprising:
executing a code function to retrieve the agent data, the contact data and the interaction data from the data store for delivery to a machine learning model service operating in a service provider environment, wherein the machine learning model service is responsible for building and training the machine learning model using the agent data, the contact data and the interaction data.

9. The method of claim 5, further comprising:
generating the associations and determining the selected pairs from the weighted associations using a matching process that operates in a service provider environment.

10. The method of claim 5, wherein a weighting represents the predicted interaction metric between an agent having agent attributes and a contact having contact attributes, wherein the agent attributes and contact attributes are provided as features to the machine learning model to produce the weightings as an output of the machine learning model.

11. The method of claim 5, further comprising:
receiving, via a user interface, a function that assigns a weighting to multiple types of interaction metrics;
determining, based on outputs from multiple machine learning models that correspond to the multiple types of interaction metrics, aggregated model weightings; and determining the selected pairs of agents and contacts by applying the matching rules to the aggregated model weightings.

12. The method of claim 5, wherein the machine learning model is a first machine learning model, and further comprising: providing the weightings of the weighted associations to a second machine learning model to determine the selected pairs of agents and contacts.

13. The method of claim 5, wherein the matching rules are associated with a matching process selected from a group consisting of: an assignment solver process, a minimum cost flow process and a maximum cost flow process.

14. The method of claim 5, wherein a communication between an agent and a contact is at least one of: a voice-based communication, a text-based communication, a visual communication or a computer network communication.

15. The method of claim 5, further comprising:
limiting a number of agents and a number of contacts to be below a defined threshold for generating the associations; or
dividing the agents and the contacts into sub-groups of agents and contacts having a size that is below the defined threshold for generating the associations.

16. The method of claim 5, further comprising:
receiving a communication request from a contact; and
placing the contact on a queue of contacts who intend to communicate with the agents, wherein the associations that include the contacts are generated based in part on the queue of contacts.

17. A system, comprising:
at least one processor; and
at least one memory device including a data store to store a plurality of data and instructions that, when executed, cause the system to:
receive communication requests from contacts associated with contact identifiers;
identify agents that are available to communicate with the contacts, wherein the agents are associated with agent identifiers;
generate a bipartite graph that includes agent nodes corresponding to the agent identifiers and contact nodes corresponding to the contact identifiers, wherein the bipartite graph includes edges between the agent nodes and the contact nodes;
determine, using a machine learning model, edge weightings for the edges in the bipartite graph to produce a weighted bipartite graph, wherein the edge weightings represents a predicted interaction metric between the agents associated with the agent nodes and the contacts associated with the contact nodes;
determine, using the edge weightings from the weighted bipartite graph, selected pairs of agents and contacts by applying a matching process to the weighted bipartite graph; and
transmit, in response to the communication requests, communication assignments to enable communications to be established between the contacts and the agents in accordance with the selected pairs of agents and contacts.

18. The system of claim 17, wherein the plurality of data and instructions, when executed, cause the system to:
receive, from a data store, agent data comprising a plurality of agent identifiers and corresponding agent attribute information;
receive, from the data store, contact data comprising a plurality of contact identifiers and corresponding contact attribute information;
receive, from the data store, interaction data for the plurality of agent identifiers and the plurality of contact identifiers, wherein the interaction data includes a type of interaction metric corresponding to interactions between agents associated with the agent identifiers and contacts associated with the contact identifiers; and
build and train the machine learning model for the type of interaction metric based in part on the agent data, the contact data and the interaction data.

19. The system of claim 17, wherein the plurality of data and instructions, when executed, cause the system to:
receive, via a user interface, a function that assigns a weighting to multiple types of interaction metrics;
determine, based on outputs from multiple machine learning models that correspond to the multiple types of interaction metrics, aggregated model weightings for edges in an aggregated weighted bipartite graph; and
determine the selected pairs of agents and contacts by applying matching rules to the aggregated weighted bipartite graph.

20. The system of claim 17, wherein the plurality of data and instructions, when executed, cause the system to:
limit a first number of the agents nodes and a second number of the contact nodes to be below a defined threshold for generating the bipartite graph; or
divide the agent nodes and the contact nodes into sub-groups of agent nodes and contact nodes having a size that is below the defined threshold for generating the bipartite graph.

* * * * *